United States Patent [19]
Everts et al.

[11] Patent Number: 5,351,590
[45] Date of Patent: Oct. 4, 1994

[54] SCROLL SAW CLAMP AND METHOD FOR MAKING THE SAME

[75] Inventors: Robert G. Everts; Naoki Kikuchi, both of Chandler; Chi-Kin Chiang, Phoenix, all of Ariz.

[73] Assignee: Ryobi Limited, Japan

[21] Appl. No.: 125,346

[22] Filed: Sep. 22, 1993

Related U.S. Application Data

[63] Continuation of Ser. No. 959,735, Oct. 13, 1992, abandoned.

[51] Int. Cl.$^5$ .............................................. B27B 19/02
[52] U.S. Cl. .................. 83/699.21; 83/662; 83/786; 29/469; 29/525.1
[58] Field of Search ............... 83/662, 698, 783–786; 30/392, 393, 394; 29/469, 525.1; 279/77, 83, 106; 403/110, 362, 373, 375, 381

[56] References Cited

U.S. PATENT DOCUMENTS

| 173,319 | 2/1876 | McChesney | 83/698 X |
|---|---|---|---|
| 199,845 | 1/1878 | McChesney | 83/698 X |
| 2,796,313 | 6/1957 | Schumacher | 279/106 X |
| 2,805,866 | 9/1957 | Amend | 403/110 X |
| 3,542,097 | 11/1970 | Dudek et al. | 30/392 |
| 4,601,477 | 7/1986 | Barrett et al. | 279/30 |
| 4,619,545 | 10/1986 | Kuttenbaum | 403/373 X |
| 4,670,986 | 6/1987 | Chen | 30/392 |
| 4,838,138 | 6/1989 | Rice et al. | 83/698 |
| 5,016,512 | 5/1991 | Huang | 83/783 |
| 5,058,280 | 10/1991 | Pollak et al. | 30/392 |
| 5,065,652 | 11/1991 | Legler et al. | 83/168 |
| 5,105,704 | 4/1992 | Chang | 83/662 |

FOREIGN PATENT DOCUMENTS 3511692  10/1986  Fed. Rep. of Germany ........ 30/393

*Primary Examiner*—Eugenia Jones
*Attorney, Agent, or Firm*—Brooks & Kushman

[57] ABSTRACT

A clamp (20) and method for making the same are disclosed. The clamp (20) has a pair of jaws (42,44), a pivot (46) and an actuator (48). Each of the jaws (42,44) has a distal end (54,56) and a clamping end (50,52). The jaws (42,44) are pivotally connected by the pivot (46) such that the actuator (48) can displace the distal ends (54,56) relative to one another causing the clamping ends (50,52) to pivot together to retain the end of a blade therebetween. Preferably, the actuator (48) is a thumbscrew and the pivot (46) is a pivot pin cooperatively retained by respective pivot apertures (60,62) located in each of the jaws (42,44). Alternatively, the pivot (46) may be tenon (164) formed on one jaw (144) and a mortise (162) formed in the other jaw (142), the tenon (164) being pivotally retained within mortise (162). The clamp (20) is manually operable to clamp the scroll saw blade without the use of separate tools such as a screw driver or an Allen wrench.

15 Claims, 3 Drawing Sheets

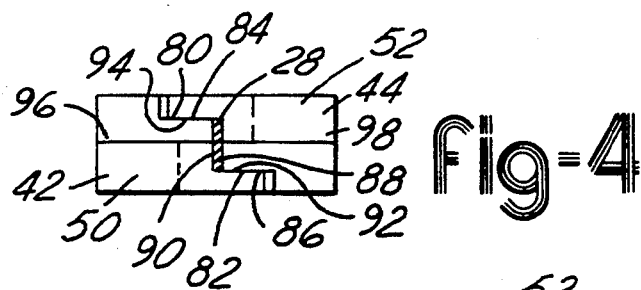
fig-4
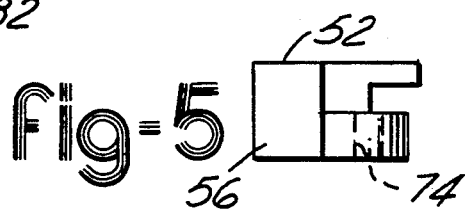
fig-5
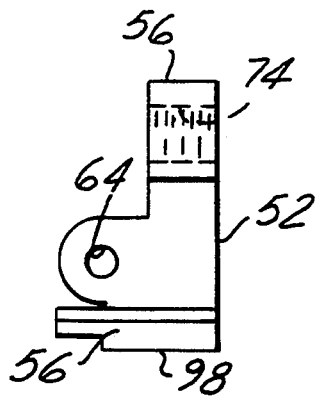 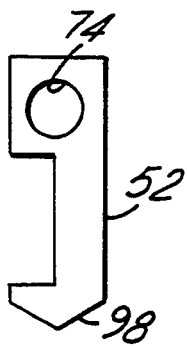 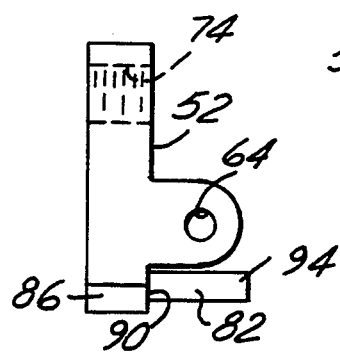 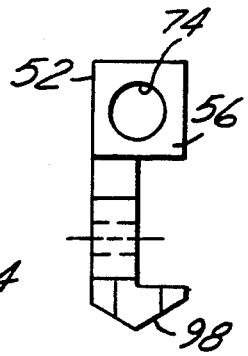
fig-9  fig-8  fig-6  fig-7
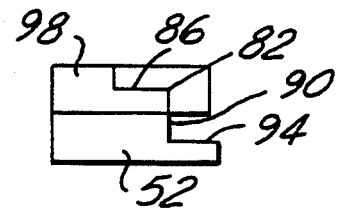
fig-10

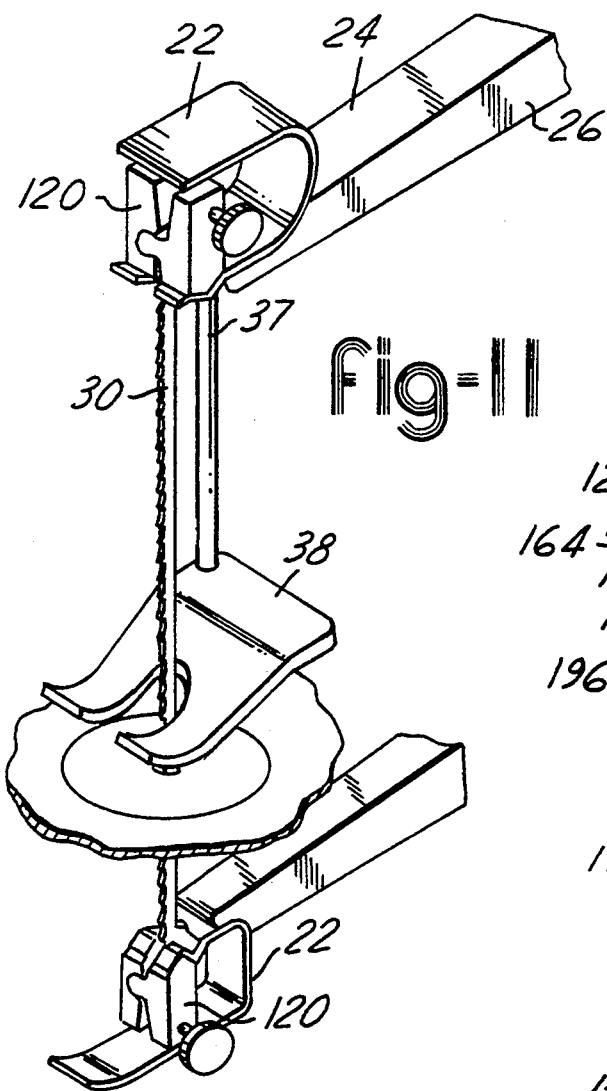
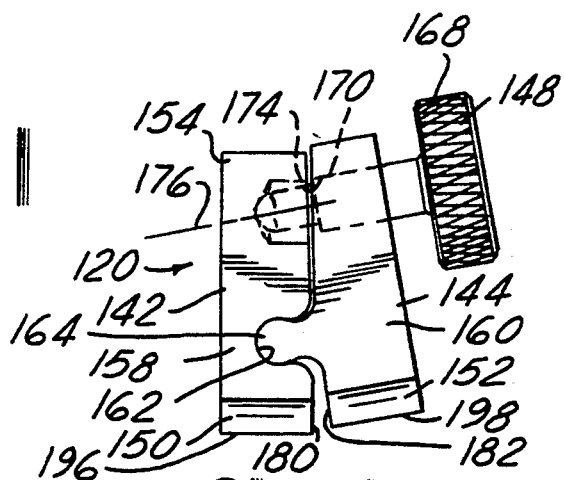
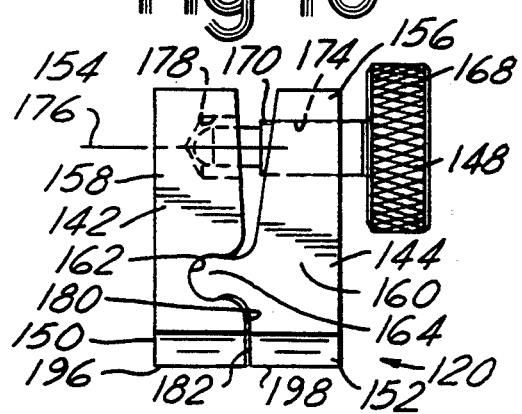
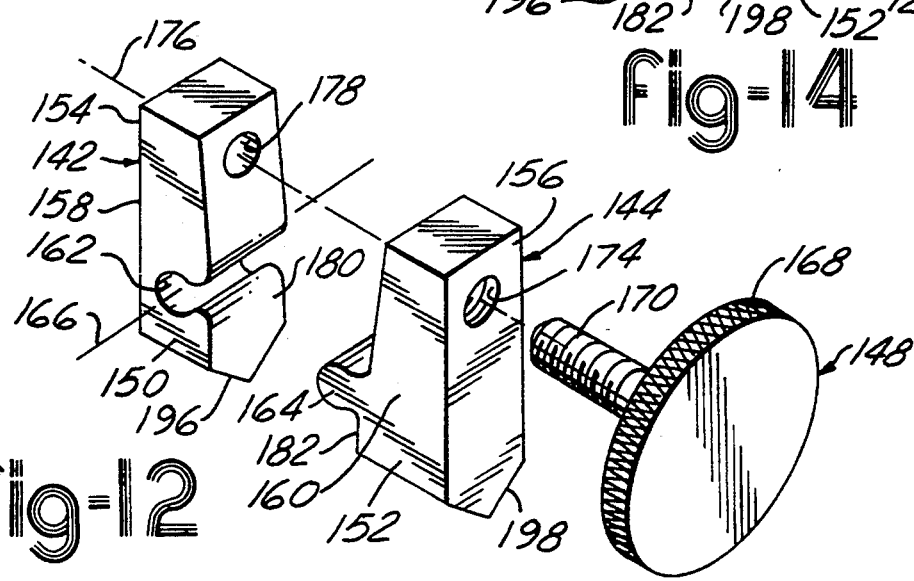

SCROLL SAW CLAMP AND METHOD FOR MAKING THE SAME

This is a continuation of copending application Ser. No. 07/959,735 filed on Oct. 13, 1992 now abandoned.

TECHNICAL FIELD

This invention relates to a scroll saw clamp for releasably retaining a scroll saw blade in a scroll saw.

BACKGROUND ART

Scroll saws are particular useful for cutting decorative two-dimensional figures from sheets of wood. This ability is in part due to use of an elongate scroll saw blade which is small in cross-section and can make accurate curvateous cuts.

For example, use of a scroll saw allows a face having a pair of spaced eyes, a nose and a mouth to be accurately cut from a sheet of wood. In present practice, to cut out a shaped aperture, such as a smiling mouth, a small hole is first drilled in the sheet of wood. A scroll saw blade is then inserted through the sheet with the ends of the blade projecting on either side of the sheet. The ends are secured by clamps which are in turn retained by support arms of the scroll saw. The desired shape is then cut from the sheet. The ends of the blade are then released from the clamps and the blade is removed from the shaped aperture. The aforementioned steps must be repeated for each aperture which is to be cut in of the sheet.

Consequently, a great deal of time is spent fastening and unfastening blades to and from the clamps. Unfortunately, many clamps for scroll saw blades are not easily and quickly fastenable and unfastenable relative to the scroll saw blades. Further, separate tools are generally required to fasten the clamp to the blades.

Clamps securing scroll saw blades are shown in a variety of U.S. patents. For example, Rice et al, U.S. Pat. No. 4,838,138, discloses a clamp having a pair of blocks with interfacing flat surfaces which are clamped together by a screw. The screw is received into a pair of threaded apertures in the blocks. The screw has a head with a hexagonal aperture designed to receive an end of an Allen wrench. The Allen wrench provides sufficient torque to threadedly join the screw and flat surfaces together about the end of the blade. An alignment pin is also used to connect the blocks.

Legler et al, U.S. Pat. No. 5,065,652, shows a clamp having a pair of members which clamp about the end of a blade. A screw is shown which has a head configured to receive the blade of a straight-edged screwdriver. Again, this reference requires a separate tool to provide tightening of the screw within threaded apertures of the clamping members.

Unfortunately, as is the case with any separate tool, the tool may become misplaced or lost. Accordingly, search time is added to the time already required to change blades into and out of the scroll saw. The subject invention addresses these shortcomings.

SUMMARY OF THE INVENTION

The present invention includes a scroll saw clamp for releasably retaining an end of an elongate scroll saw blade. The clamp comprises first and second jaws, each jaw having a clamping end and a distal end, a pivot for cooperatively pivoting each of the jaws with respect to one another and an actuator for moving the distal ends of the jaws relative to one another. The distal ends may be moved such that the clamping ends are pivoted together to clampingly retain the end of the scroll saw blade therebetween.

In a first preferred embodiment, the pivot preferably includes a pivot pin and each of the jaws has pivot aperture formed therein. The pivot pin is cooperatively received in the respective pivot apertures such that the jaws may be pivoted with respect to one another to effect the clamping of the end of the scroll saw blade between the clamping ends.

The actuator preferably is a thumbscrew. The thumbscrew is threadedly received into a threaded aperture of one of the distal ends and cooperates with the other distal end to move the distal ends relative to one another. This cooperation may be in the form of abutment of the end of the thumbscrew upon one of the distal ends. The jaws may also be configured such that distal ends are moved together relative to one another to effect the pivoting together of the clamping ends.

The clamping ends are configured to cooperatively retain the end of the blade. Preferably, the cooperating clamping ends are configured to surround the end of the blade. This prevents movement perpendicular to the longitudinal axis of the blade between the clamping ends and the blade when the blade is clamped between the clamping ends. Ideally, the clamping ends have stepped surfaces which interfit with respect to one another to form a rectangular region into which the blade is received.

Preferably, the actuator is located a greater distance from the pivot than are the clamping ends thereby establishing a mechanical advantage in favor of the actuator. Accordingly, the force applied by the actuator to the distal ends is multiplied into a greater force applied across the clamping ends and the end of the scroll saw blade. Ideally, ratio of this mechanical advantage is on the order of three. This allows the actuator or thumbscrew to be manually manipulated, without the use of a separate tool such as an Allen wrench or screwdriver, to create a sufficient clamping force across the clamping ends to releasably retain the end of the saw blade therebetween.

Each of the jaws may include an intermediate portion which extends inboard with respect to the other jaw and which portions overlie one another. The pivot apertures are located on the respective intermediate portion.

The present invention also includes a method for making a scroll saw clamp. First and second jaws are formed each having a distal and a clamping end. Ideally the jaws formed are generally identically in configuration such that only a single configuration of the jaw need be formed. The jaws are then pivotally attached by a pivot so that they pivot with respect to one another. An actuator is then affixed to the distal ends of the jaws so that the distal ends may be moved with respect to one another with the clamping ends pivoting together to clamp and retain a scroll saw blade therebetween. Again, the pivot may be a pivot pin and the actuator a thumbscrew.

Alternatively, in a second preferred embodiment, the pivot may be a dovetail joint having a tenon on the jaws and a mortise on the other, the tenon being pivotally retained in the mortise.

It is an object of the present invention to provide a scroll saw clamp which is manually operable to releasably and clampingly retain the end of a scroll saw blade wherein no separate tools are needed to secure or release the blade relative to the clamp.

It is another object to provide a scroll saw clamp which has two nearly identical jaws such that only a single jaw configuration need be made.

It is still a further object to provide a scroll saw clamp having jaws which are pivotally attached to one another and use a mechanical advantage to apply a large force across a pair of respective clamping ends on the jaws by applying a relatively small force to ends distal to the clamping ends.

Other objects, features and advantages will become more readily apparent from the following description and accompanying sheets of drawings.

BRIEF DESCRIPTION OF THE DRAWINGS

FIG. 4 is a bottom plan view, taken along line 4—4 of FIG. 2, of the scroll saw clamp retaining the end portion of the scroll saw blade;

FIG. 5 is top plan view of one of the two jaws of the scroll saw clamp which has a threaded aperture;

FIG. 6 is a front view of the jaw of FIG. 5;

FIG. 7 is a side view of the jaw of FIG. 5;

FIG. 8 is an opposite side view of the jaw of FIG. 5;

FIG. 9 is back view of the jaw of FIG. 5;

FIG. 10 is a bottom plan view of the jaw of FIG. 5;

FIG. 11 is a fragmentary view of a pair of scroll saw clamps, made in accordance with a second preferred embodiment of the present invention, retaining a scroll saw blade in a scroll saw;

FIG. 12 is an exploded perspective view of first and second jaws and a thumbscrew of one of the scroll saw clamps in FIG. 11;

FIG. 13 is an elevational view of the clamp of FIG. 12 assembled and in an open position; and FIG. 14 is an elevational view of the scroll saw blade of FIG. 12 in a closed or clamping position.

BEST MODES FOR CARRYING OUT THE INVENTION

Figure 1:
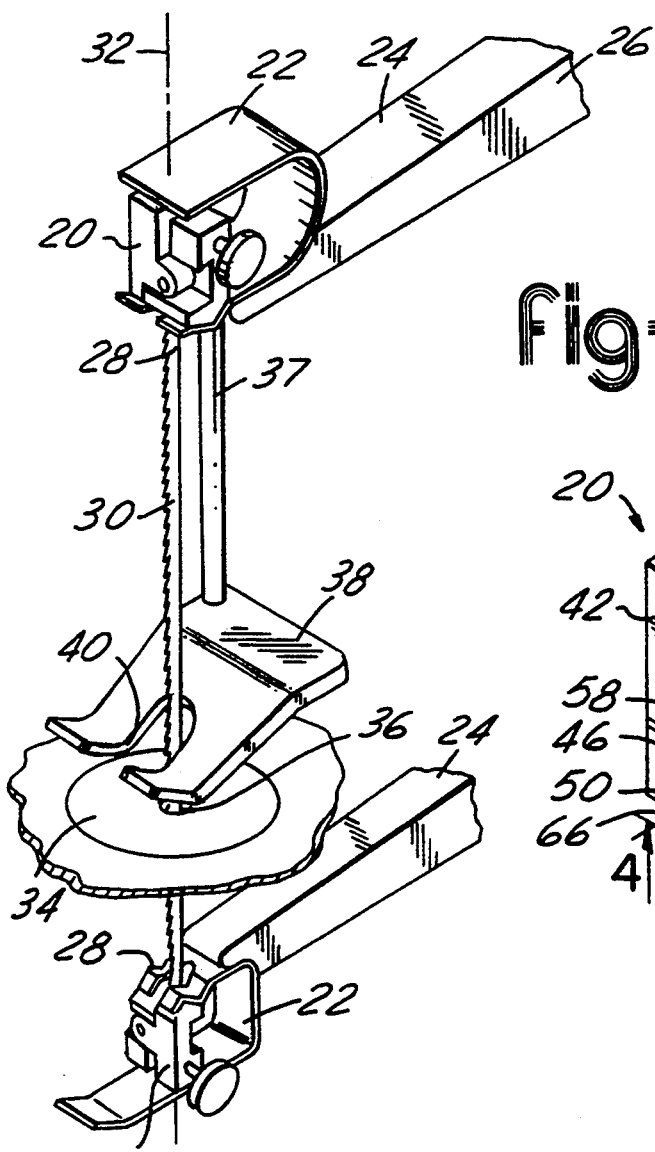
FIG. 1 is a fragmentary view of a pair of scroll saw clamps, made in accordance with a first preferred embodiment of the present invention, releasably retaining a scroll saw blade to brackets secured to support arms of a scroll saw.

A pair of scroll saw clamps 20, made in accordance with a first preferred embodiment of the present invention, is shown in FIG. 1. Clamps 20 are supported within a pair of brackets 22, which in turn, are supported at the ends of arms 24 of scroll saw 26. Clamps 20 releasably retain the respective ends 28 of an elongated scroll saw blade 30. Saw blade 30 is oriented along a longitudinal axis 32. The arms 24 may be moved longitudinally, by a mechanism not shown, to vary the tension applied across saw blade 30.

A fragmentary portion of a sheet 34 of material to be cut is shown with an aperture 36 formed therein. Saw blade 30 is received through aperture 36 with respective ends 28 of saw blade 30 extending longitudinally above and below the sheet 34. A support rod 37 extends downwardly from the upper arm 24 and supports a guide 38. During operation of scroll saw 26, guide 38 rests upon sheet 34 to prevent sheet 34 from moving longitudinally. The guide 38 has a U-shaped notch 40 through which blade 30 passes.

Figure 2:
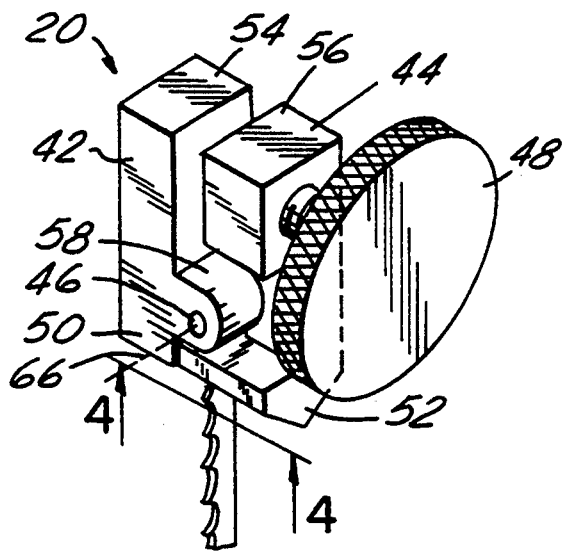
FIG. 2 is a perspective view of a scroll saw clamp releasably retaining the end of the scroll saw blade.
Figure 3:
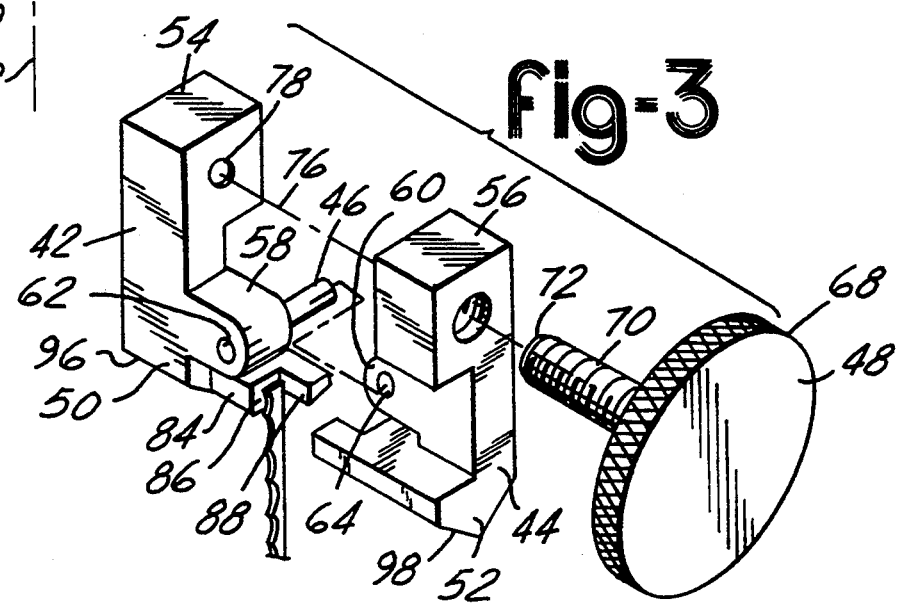
FIG. 3 is an exploded perspective view of the scroll saw clamp and an end portion of the scroll saw blade.

Turning now to FIGS. 2 and 3, scroll saw clamp 20 comprises a pair of cooperating jaws 42 and 44, a pivot pin 46 and a thumbscrew 48. Preferably, each of the jaws 42 and 44 are of identically configuration with the exception of generally apertures machined into each of the jaws 42 and 44, which will be described below. Accordingly, only a single casting mold need be made to produce either jaw 42 or 44.

Jaws 42 and 44 each have respective clamping ends 50 and 52 and distal ends 54 and 56. Located between clamping ends 50 and 52 and distal ends 54 and 56 are respective intermediate portions 58 and 60. Each of intermediate portions 58 and 60 extends inboard relative to respective jaws 42 and 44 and overlie one another. Pivot apertures 62 and 64 are formed in intermediate portions 58 and 60 and extend coaxially along transverse axis 66. Pivot pin 46 is preferably secured within pivot aperture 62 and is pivotally received within pivot aperture 64 thereby allowing jaws 42 and 44 to pivot with respect to one another about transverse axis 66.

Thumbscrew 48 has an enlarged head 68 and a threaded shaft 70 which terminates in abutment end 72. Enlarged head 68 is knurled and allows a user to manually apply a larger torque to thumbscrew 48 than could be applied to a comparable thumbscrew with a smaller diameter head.

Distal ends 54 and 56 are spaced apart laterally by intermediate portions 58 and 60. Distal end 56 has a threaded aperture 74 machined and tapped therein and coaxially aligned along a lateral axis 76. Threaded aperture 74 threadedly receives threaded shaft 70 of thumbscrew 48. Distal end 54 has an abutment recess 78 machined therein which is also coaxially aligned along lateral axis 76. Threaded shaft 70 is threadedly received within threaded aperture 74 while abutment end 72 is received within abutment recess 78. The lateral separation between distal ends 54 and 56 is controlled by the length of insertion of threaded shaft 70 within threaded aperture 74 and abutment recess 78.

As best seen in FIG. 4, clamping ends 50 and 52 have a pair of cooperating stepped surfaces 80 and 82 which interfit together about end 28 of blade 30. Stepped surfaces 80 and 82, respectively, include first inboard extending planar surfaces 84 and 86, second transverse extending planar surfaces 88 and 90 and third inboard extending planar surfaces 92 and 94. Surfaces 88, 90, 92, and 94 combine to form a rectangular perimeter around end 28 of blade 30 thereby preventing end 28 from moving perpendicular to the longitudinal axis 32 of blade 30.

As seen in FIG. 1, clamping ends 50 and 52 further have V-shaped nesting surfaces 96 and 98 which mate with corresponding V-shaped grooves in each of brackets 22. Clamps 22 are securely retained in brackets 22 when arms 24 are moved longitudinally apart and tension is placed across blade 30.

Clamp 20 is designed to be manually clamped about end 28 of blade 30. The distance from lateral axis 76 to transverse axis 66 is preferably 2–3 times as great as the distance from axis 66 to the center of interfitting stepped surfaces 80 and 82. Accordingly, a mechanical advantage on the order of 2–3 is established between forces applied on distal ends 54 and 56 and resulting forces applied across clamping ends 50 and 52.

A method of making clamp 20 includes first forming jaws 42 and 44 in the general configuration shown in FIGS. 5-10. Next, respective pivot apertures 62 and 64 are machined into jaws 42 and 44. Threaded aperture 74 is machined and tapped into distal end 56 and abutment recess 78 is machined into distal end 54.

Pivot pin 46 is then placed into the respective pivot apertures 62 and 64 to allow the jaws 42 and 46 to pivot with respect to one another. Ideally, pivot pin 46 is of constant diameter with one end being press fit into pivot aperture 62 and the other pivotally received into pivot aperture 64 which is a larger diameter than pivot pin 46. Thumbscrew 48 is threaded into threaded aperture 74 until it is received into abutment recess 78.

This process is repeated for the other clamp 20. The pair of clamps 20 are then mounted within respective brackets 22. Ends 28 of blade 30 are placed into regions formed between respective stepping surfaces 80 and 82. Each thumbscrew 48 is rotated to pivot distal ends 54 and 56 apart until sufficient clamping force is applied by clamping ends 50 and 52 across ends 28 of blade 30.

A second preferred embodiment of a clamp 120, made in accordance with this invention, is shown in FIGS. 11-14. Again, a pair of clamps 120 are held within a pair of longitudinally spaced brackets 22 in the manner similar to that described above with respect to clamps 20.

FIG. 12 shows one of the clamps 120 in an exploded perspective view. Clamp 120 includes a first jaw 142, a second jaw 144 and a thumbscrew 148.

Jaw 142 includes a clamping end 150, a distal end 154 and an intermediate portion 158 extending therebetween. Distal end 154 has an inboard facing abutment recess 178 machined or cast therein. Intermediate portion 158 has a C-shaped slot or mortise 162 which opens inboard and which extends transversely along a transverse axis 166. Clamping end 150 has a V-shaped nesting surface 196 which is configured to cooperatively reside in the V-shaped notch of bracket 22. A planar clamping surface 180 is formed on the inboard surface of clamping end 150 of jaw 142.

Jaw 144 has a clamping end 152, a distal end 156 and an intermediate portion 160. Distal end 156 includes a threaded aperture 174 extending inboard along a lateral axis 176. Intermediate portion 160 includes an inboard extending bulbous portion or tenon 164 which is sized and configured to be pivotally and slidably retained within C-shaped slot 162. Clamping end 152 has a V-shaped nesting surface 198 configured to also rest within the V-shaped notch of bracket 22. A planar clamping surface 182, complementary to clamping surface 180, is located on the inboard surface of clamping end 152 of jaw 144.

Thumbscrew 148 includes an enlarged circular head 168 and a threaded shaft 170. Head 168 is knurled on its circumferential surface.

In operation, jaws 142 and 144 are placed facing one another and transversely spaced with C-shaped slot 162 and bulbous portion 164 being coaxially aligned along transverse axis 166. Bulbous portion 164 is then slid into and pivotally retained by C-shaped slot 162. Next, thumbscrew 148 is threaded into threaded aperture 174.

As shown in FIG. 13, until threaded shaft 170 forces distal ends 154 and 156 apart, jaws 142 and 144 are free to pivot with bulbous portion 164 sliding within C-shaped slot 162. Accordingly, clamping surfaces 180 and 182 may be separated sufficiently introduce the end 28 of a scroll saw blade 30 therebetween.

Looking to FIG. 14, when threaded shaft 170 is sufficiently received within threaded aperture 174, distal ends 154 and 156 are forced apart. Correspondingly, a large clamping force is applied across clamping surfaces 180 and 182. This clamping force is used to hold an end 28 of scroll saw blade 30 as illustrated in FIG. 11.

While this invention has been described in the foregoing specification in relation to certain preferred embodiments thereof, and many details have been set forth for the purposes of illustration, it will be apparent to those skilled in the art that the invention is susceptible to additional embodiments and that certain details described herein can be varied considerably without departing from the basic principles of the invention.

For example, the distal ends could be configured such that the distal ends are moved together rather than apart to create the clamping force across the clamping ends. An example of this type of configuration is provided by a standard pair of pliers. Further, each of the distal ends could have threaded apertures for receiving a thumbscrew so that the distal ends may be pulled together. Further, the interfitting surfaces described in the first embodiment may also be used in the second embodiment in place of the planar clamping surfaces.

What is claimed is:

1. A clamp for releasably retaining an end of a saw blade during operation of a saw, the clamp comprising:
   separate first and second jaws, each jaw having a clamping end and a distal end;
   pivot means intermediate the clamping and distal ends for cooperatively enabling the pivoting of each of the jaws with respect to the other about a single axis; and
   actuation means for pivoting the jaws relative to one another about the pivot means sufficiently to clampingly retain the end of the saw blade therebetween during the operation of the saw blade.

2. The clamp of claim 1 wherein the actuation means moves the distal ends apart to pivot the clamping ends together.

3. The clamp of claim 1 wherein the pivot means includes a pivot pin and each of the jaws has a pivot aperture formed therein, the pivot pin being received within the respective pivot apertures so that the jaws are pivotable with respect to one another about the pivot pin.

4. The clamp of claim 3 wherein each of the jaws has an intermediate portion, each intermediate portion extending inboard relative to the other jaw and overlying the other intermediate portion, the pivot apertures being located in the intermediate portions.

5. The clamp of claim 3 wherein each of the jaws is generally identical in configuration.

6. The clamp of claim 1 wherein each of the clamping ends are configured to cooperate with one another to surround the end of the blade thereby preventing relative movement between the clamping ends and the end of the blade during operation of the saw blade.

7. The clamp of claim 6 wherein each of the clamping ends has interfitting stepped surfaces which cooperate to surround the blade.

8. The clamp of claim 1 wherein the distance between the pivot means and the actuation means is greater than the distance between the pivot means and the cooperating clamping ends whereby a mechanical advantage exists in favor of the actuation means.

9. The clamp of claim 1 wherein the pivot means is a dovetail joint having a tenon on one of the jaws and a mortise on the other of the jaws.

10. The clamp of claim 9 wherein the tenon and the mortise are integral with their respective jaw.

11. A clamp for releasably retaining an end of a saw blade during operation of a saw, the clamp comprising:
separate first and second jaws, each jaw having a clamping end and a distal end;
pivot means intermediate the clamping and distal ends for cooperatively enabling the pivoting of each of the jaws with respect to the other about a signal axis; and
actuation means for pivoting the jaws relative to one another about the pivot means sufficiently to clampingly retain the end of the saw blade therebetween during the operation of the saw blade;
the actuation means including a thumbscrew and at least one of the distal ends has a threaded aperture therein into which the thumbscrew is threadedly received, the thumbscrew cooperating with the other distal end to move the distal ends relative to one another.

12. A method for making a clamp for releasably retaining the end of an elongate saw blade, the method comprising the steps of:
forming first and second jaws, each jaw having a distal end and a clamping end, the clamping ends being configured to cooperate with one another to clampingly retain the end of the blade therebetween, the first and second jaws including a tenon and a mortise;
inserting the tenon into the mortise to pivotally attach the jaws together such that the jaws pivot with respect to each other about a pivot axis; and
affixing an actuator to the distal ends of the jaws so that the distal ends are pivotable relative to one another with the clamping ends being pivotal together such that the end of the saw blade is clampingly retainable therebetween.

13. The method of claim 12 wherein the step of affixing an actuator to the distal ends includes forming a threaded aperture in at least one of the distal ends and threadedly retaining a screw therein with the screw also cooperating with the other distal end such that the screw is rotatable within the threaded aperture to move the distal ends with respect to one another to pivot the clamping ends together.

14. The method of claim 12 wherein the step of forming the first and second jaws includes forming stepped surfaces on each of the clamping ends such that the respective stepped surfaces interfit with one another to clamp about the blade.

15. The method of claim 12 wherein the step of affixing the actuator to the distal ends includes locating the actuator further from the pivot axis than are the cooperating clamping ends such that a mechanical advantage is established in the favor of the actuator relative to the cooperating clamping ends.

* * * * *